United States Patent [19]

Garbagnati

[11] Patent Number: 5,215,182

[45] Date of Patent: Jun. 1, 1993

[54] MODULAR END ELEMENT FOR CONVEYOR

[75] Inventor: Carlo Garbagnati, Castello Brianza, Italy

[73] Assignee: Regina Sud S.p.A., Latina, Italy

[21] Appl. No.: 944,120

[22] Filed: Sep. 11, 1992

[30] Foreign Application Priority Data

Sep. 19, 1991 [IT] Italy .................. MI91U-000813

[51] Int. Cl.[5] ............................. B65G 47/74
[52] U.S. Cl. ............................ 198/635; 198/325; 198/600
[58] Field of Search .................. 198/325, 600, 635

[56] References Cited

U.S. PATENT DOCUMENTS 1,280,950 10/1918 Bernheim ...................... 198/600
2,141,876 12/1938 Perkins ......................... 198/600
2,624,444 1/1953 Casabona ...................... 198/600
3,126,084 3/1964 Sinden .......................... 198/325
4,858,751 8/1989 Hodlewsky .................... 198/325

Primary Examiner—Joseph E. Valenza
Attorney, Agent, or Firm—Stevens, Davis, Miller & Mosher

[57] ABSTRACT

An end element (10) comprises one comb-shaped portion (12) having fingers extending in the passageways between the ribs (13) of an endless conveyor (11) for identifying a surface at the upper part thereof which is substantially the extension of the transfer surface at the end of the conveyor. The end element (10) further comprises a second portion (14) following the first one, which is lowered and is designed to receive, by removable fixing, the slide elements (16, 22) forming the substantial extension of the surface defined by the fingers. The slide elements can be either a roller element (16) or a dragging element (22).

4 Claims, 2 Drawing Sheets

MODULAR END ELEMENT FOR CONVEYOR

FIELD AND BACKGROUND OF THE INVENTION

In the field of endless conveyors, conveyors are known that are formed with pivotally mounted links having a plurality of ribs at the upper part thereof, which are longitudinal to the movement direction of the conveyor and define the resting surface for the items carried thereon. At the outgoing end of the conveyor, end elements are present which consist of fixed fingers to be inserted between the link ribs in order to create an extension of the resting surface of the conveyor capable of receiving the carried items. The outgoing items are then heaped up against each other by sliding on the fixed fingers and the following surface forming an extension thereof.

In order to reduce shocks and side thrusts on the outgoing items at the conveyor end, conveyors have also been proposed in which the end elements consist of dragging fingers followed by rollers for facilitating the sliding of items collected by said fingers. However the mounting of said elements provided with dragging fingers alone or with rollers as well is not modular, which means that it is rather difficult to pass from one arrangement to the other depending for example on the goods to be carried, as the various elements are not readily interchangeable. In addition, as it is necessary to provide completely different elements for the above two solutions, costs are higher and storage problems arise.

Essentially, it has not been hitherto possible to use the same base elements for achieving outgoing ends provided with rollers or with a mere sliding surface, through simple assembling operations.

SUMMARY OF THE INVENTION

The general object of the invention is to eliminate the above mentioned drawbacks by providing an end element for a conveyor of the above type enabling a modular assembling either of a sliding portion or of a sliding portion and a rolling portion.

In view of the above object, in accordance with the invention an end element has been provided, of the type located close to one end of an endless conveyor having a discontinuous transfer surface identified by the upper edges of ribs defining passageways therebetween in the transportation direction, said end element comprising one comb-shaped portion having fingers extending in the passageways between the ribs so as to define at the upper part thereof, a surface being a substantial extension of the transfer surface at the end of the conveyor, and further comprising a second portion following the first one which is lowered and is designed to receive, by removable fixing, slide elements being a substantial extension of the surface defined by the fingers.

BRIEF DESCRIPTION OF THE DRAWINGS

For a better understanding of the innovative principles and advantages of the present invention as compared to the known art, a possible embodiment of the invention will be given hereinafter by way of nonlimiting example, with the aid of the accompanying drawings, in which.

DESCRIPTION OF THE PREFERRED EMBODIMENT

Figure 1:
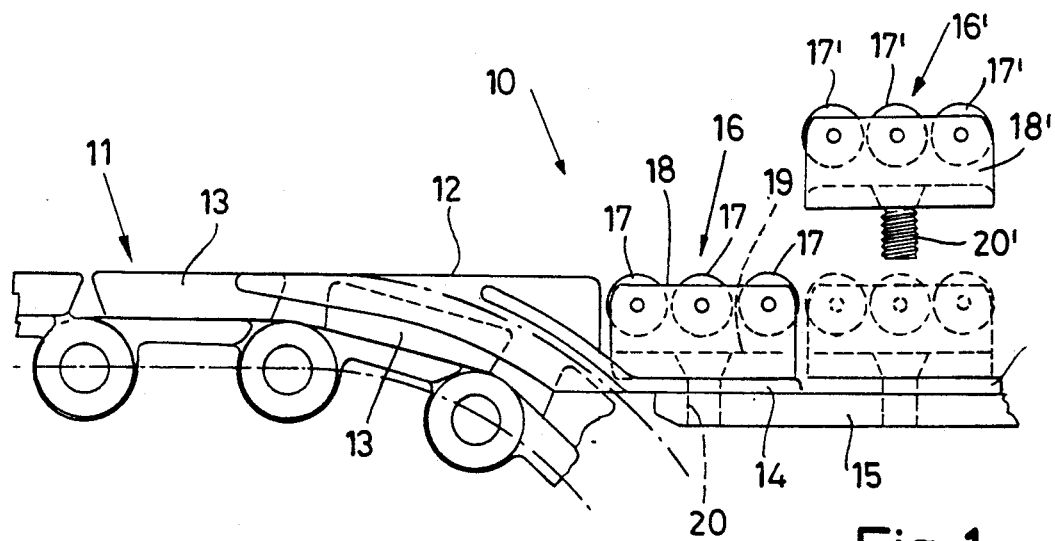
FIG. 1 is a diagrammatic partial and exploded view in side elevation of the end area of a conveyor in accordance with the invention.

Referring to the drawings, an end element 10 is disposed at the end of a link conveyor 11, that is at a location where the conveyor is bent downwardly. The end element is comprised of a "comb" formed with a plurality of parallel fingers 12 that (as clearly shown in FIG. 2) are inserted between the ribs 13 disposed at the upper part of the conveyor links so as to define a resting surface for the items carried thereon, constituting an extension of the conveyor surface where said conveyor is bent downwardly, substantially as in the known art.

Fingers 12 are the extension of a base or lowered portion 14 of the end element 10 which is supported by a fixed support 15. Fastened to the lowered portion 14 is a roller bed 16 consisting of a plurality of idler rollers 17 disposed in aligned rows and supported by shoulders 18 at the ends.

Advantageously, shoulders 18 are part of a generally U-shaped support 19 fastened to the base portion 14 by screws 20.

Figure 2:
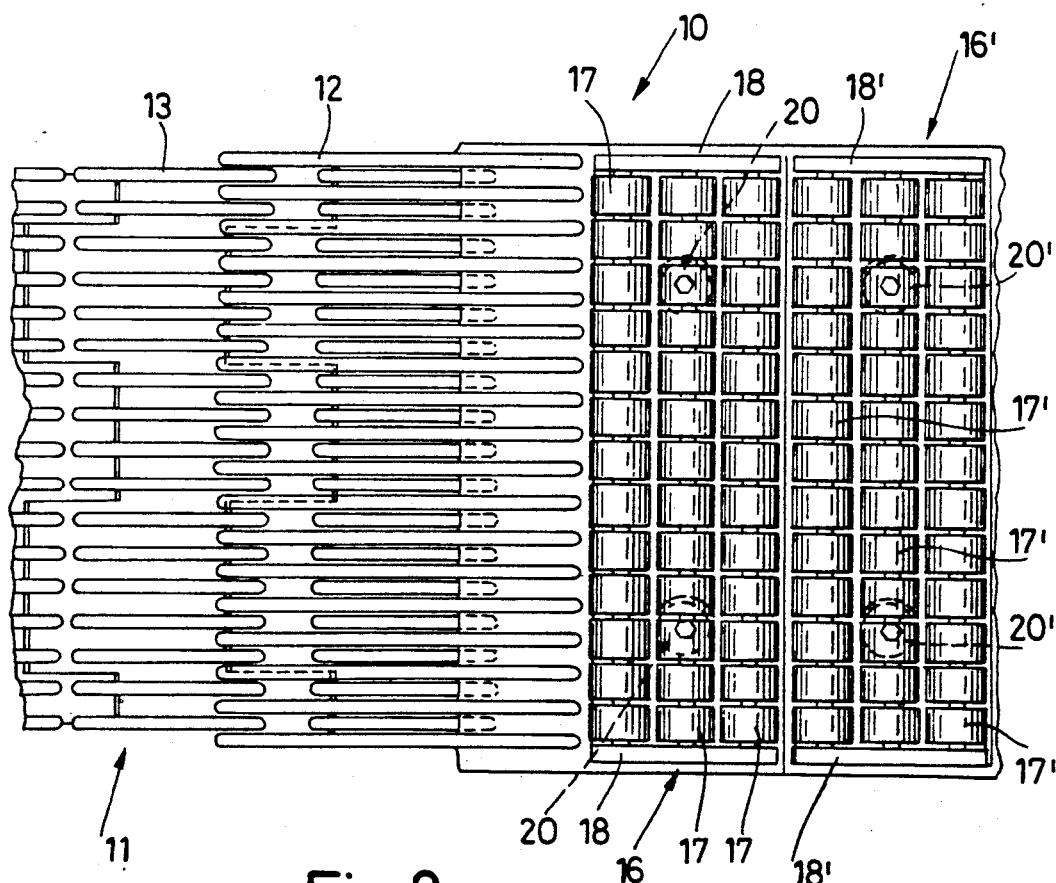
FIG. 2 is a plan view of the end area shown in FIG. 1.

The longitudinal extension of the roller bed can be of various kinds. For example, for achieving a greater flexibility, the possibility of fastening a modular sequence of roller beds to the support 15 may be provided. The roller beds forming the sequence may advantageously be similar to one another as shown in FIGS. 1 and 2. Thus there will be a first roller bed 16 close to the fingers, and similar roller beds 16' disposed consecutively thereto and fastened to the support plate 15 by screws 20'. In FIG. 1 one of these roller beds 16' is shown exploded from the end element (in solid line) and in operating position (in phantom line).

In order to keep the rollers of the different roller beds to the same height, a shim 21 is provided intermediate the roller beds 16' and support 15.

As can be now readily understood, items moving along the conveyor come onto the fingers 12 and by inertia go beyond the short extension of said fingers so as to reach the following roller beds on which they smoothly reduce their speed as far as they stop. If items arrive in sequence, the new items will push forward the items already on the roller beds that will move without any important frictions due to the presence of the idler rollers, so that thrusts of items on the side walls will be reduced.

Being the roller beds of the modular type, it will be possible to arrange a deceleration and thrust area having a low friction, extending longitudinally to the movement direction as far as it is deemed necessary for the particular application involved.

The separability and modular features of the roller beds also offer further advantages.

Figure 3:
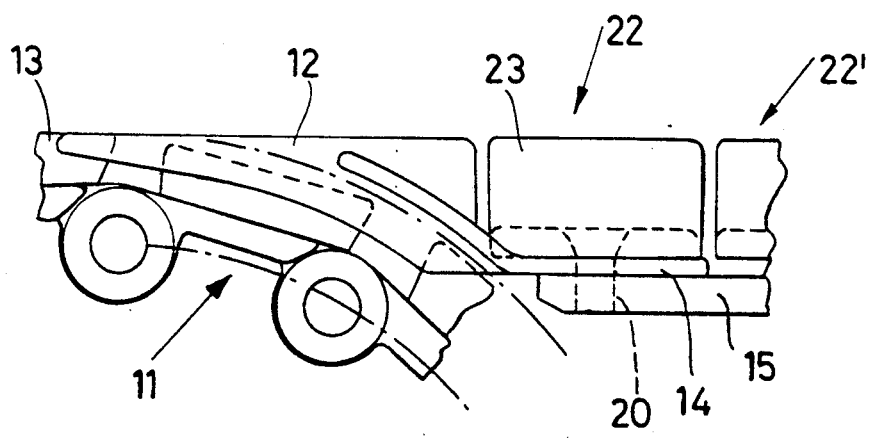
FIG. 3 is a diagrammatic partial view in side elevation of the end area of the conveyor shown in FIG. 1, having however a different adaptation.
Figure 4:
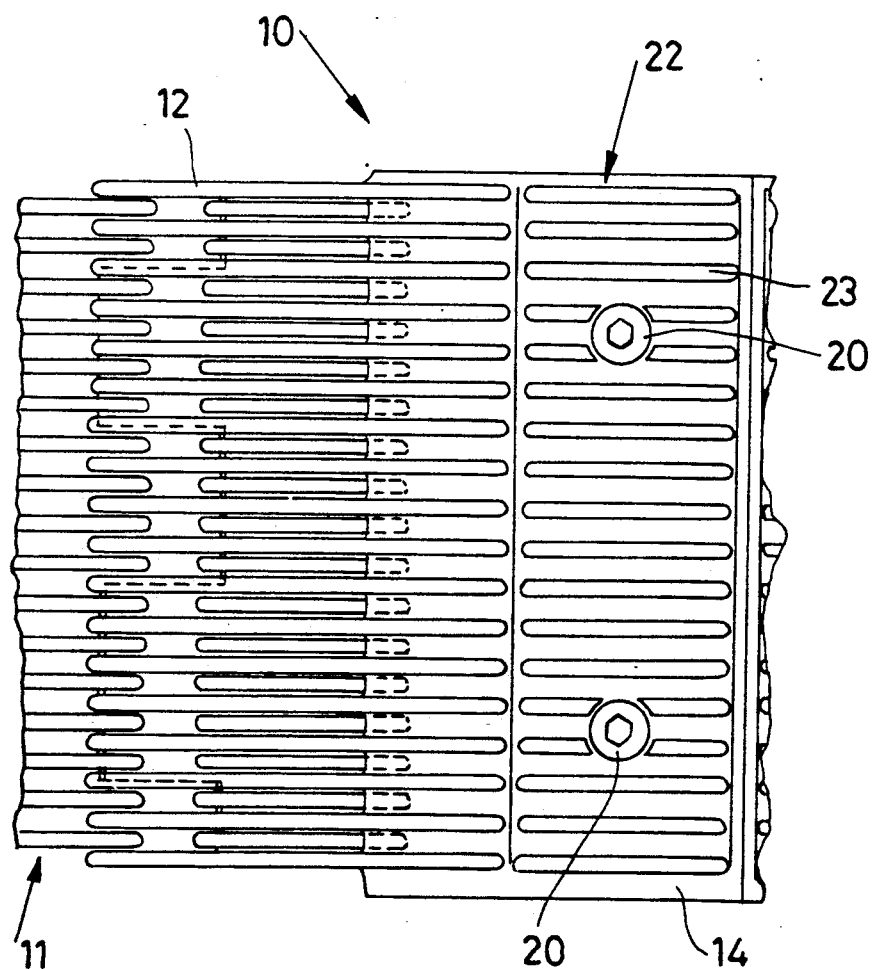
FIG. 4 is a plan view of the end area shown in FIG. 3.

In fact, as shown in FIGS. 3 and 4, it is also possible to insert elements 22 having at the upper part thereof ribs 23 being substantially an extension of fingers 12, in place of said roller beds. In this way end elements can be made which offer various combinations involving rib-provided or roller-provided areas and it is also possible to assemble an end element only provided with ribs when the features of the transported goods allow it, and substitute rollers for ribs when required, due to a change in the transported goods.

In addition, when rollers are used, the dragging area formed by fingers can be reduced to a minimum, which brings about a reduction of stresses on the carried items, as fingers are fastened by means of a rear projection 14 located under the subsequent rollers.

It is now apparent that the intended purposes have been attained. A conveyor provided with an end element as above described enables dangerous stresses to the carried items to be avoided and in addition offers a great flexibility of assembling, so that it may suit the various operating conditions as required.

Obviously the above description of one embodiment applying the innovative principles of the invention is given by way of example only and must not be considered as a limitation of the scope thereof as hereinafter claimed.

For example the shape of the conveyor links may be different from the one shown by way of example, since they can be of any known types. Consequently also the shape and arrangement of the fingers of the end element will be different for enabling the insertion of said fingers between the ribs of the particular links used. The number and shape of the roller rows for each roller bed can be different too, depending on requirements.

In addition, element 22 can be such made as to offer a flat surface instead of a surface provided with ribs, if the corresponding friction increase is negligible for the particular application involved.

What is claimed is:

1. An end element of the type located close to one end of an endless conveyor having a discontinuous transfer surface identified by the upper edges of ribs defining passageways therebetween in the transportation direction, said end element comprising one comb-shaped portion having fingers extending in the passageways between the ribs so as to define at the upper part thereof, a surface which is substantially the extension of the transfer surface at the end of the conveyor, and further comprising a second portion following the first one which is lowered and is designed to receive, by removable fixing, slide elements being a substantial extension of the surface defined by the fingers.

2. The end element as claimed in claim 1, wherein the slide element is in the form of a plate from which ribs project which substantially identify at the upper part thereof, the extension of the surface defined by said fingers.

3. The end element as claimed in claim 1, wherein the slide element is in the form of a plate carrying support shafts for idler rollers substantially defining at the upper part thereof, the extension of the surface defined by said fingers.

4. The end element as claimed in claim 1, wherein the removable fastening of the slide elements is achieved by means of screws passing through the second lowered portion as well, for fixing on a support structure.

* * * * *